(12) United States Patent
Lu et al.

(10) Patent No.: US 8,091,616 B2
(45) Date of Patent: Jan. 10, 2012

(54) ENHANCED HEAT TRANSFER TUBE AND MANUFACTURE METHOD THEREOF

(75) Inventors: Minghua Lu, Jiangsu (CN); Chunming Zhang, Jiangsu (CN); Xing Luo, Jiangsu (CN); Haoping Zhou, Jiangsu (CN)

(73) Assignee: Jiangsu Cuilong Precision Copper Tube Corporation, Changshu, Jiangsu (CN)

( * ) Notice: Subject to any disclaimer, the term of this patent is extended or adjusted under 35 U.S.C. 154(b) by 705 days.

(21) Appl. No.: 12/170,904

(22) Filed: Jul. 10, 2008

(65) Prior Publication Data

US 2009/0229806 A1    Sep. 17, 2009

(30) Foreign Application Priority Data

Mar. 12, 2008 (CN) .......................... 2008 1 0019684

(51) Int. Cl.
   *F28F 13/18* (2006.01)
   *B21D 53/06* (2006.01)
(52) U.S. Cl. .................... 165/133; 165/184; 29/890.048; 29/890.053; 72/98
(58) Field of Classification Search ................ 165/133, 165/184; 29/890.048, 890.053; 72/98
   See application file for complete search history.

(56) References Cited

U.S. PATENT DOCUMENTS

| | | | | |
|---|---|---|---|---|
| 4,216,826 A * | 8/1980 | Fujikake | ................. | 165/133 |
| 4,660,630 A * | 4/1987 | Cunningham et al. | ......... | 165/133 |
| 4,705,103 A * | 11/1987 | Zogg et al. | ................. | 165/133 |
| 5,186,252 A * | 2/1993 | Nishizawa et al. | ........... | 165/133 |
| 5,337,807 A * | 8/1994 | Ryan | ............................. | 165/184 |
| 5,377,746 A * | 1/1995 | Reid et al. | .................... | 165/184 |
| 5,682,946 A * | 11/1997 | Schmidt et al. | ................ | 165/133 |
| 5,775,411 A * | 7/1998 | Schuez et al. | .................. | 165/133 |
| 5,803,165 A * | 9/1998 | Shikazono et al. | ........... | 165/184 |
| 6,644,388 B1 * | 11/2003 | Kilmer et al. | ................. | 165/133 |

FOREIGN PATENT DOCUMENTS

| | | | | |
|---|---|---|---|---|
| CN | 1090750 A | 8/1994 | | |
| CN | 1100517 A | 3/1995 | | |
| CN | 2257376 Y | 7/1997 | | |
| CN | 1366170 A | 8/2002 | | |
| CN | 2557913 Y | 6/2003 | | |
| CN | 2572324 Y | 9/2003 | | |
| CN | 2662187 Y | 12/2004 | | |
| CN | 1731066 | 2/2006 | | |
| JP | 54065865 A * | 5/1979 | ..................... | 165/133 |
| JP | 56059194 A * | 5/1981 | ..................... | 165/133 |
| JP | 56087796 A * | 7/1981 | ..................... | 165/133 |

* cited by examiner

Primary Examiner — Leonard R Leo
(74) Attorney, Agent, or Firm — Knobbe, Martens, Olson & Bear, LLP

(57) ABSTRACT

A heat transfer tube can comprise a tube body, and outer fins integrated with the tube body which are formed by allowing material on the tube body to extend along radial direction of the tube body and wind and extend around the tube outer surface in helical manner, wherein microscale channels are formed on at least one lateral surface of the outer fin. The invention has the advantage that the microscale channel is formed on at least one lateral surface of the outer fin to help increase the heat exchange area of the outer fin surface, improve the fluid disturbance, enhance the forced convention heat exchange out of tube, and significantly improve the heat transfer coefficient; when the enhanced heat transfer tube in the present invention is applied on an evaporator, the microscale channel can greatly increase the number of the nucleation sites, so as to enhance boiling heat exchange in condition of low heat flux density; when the enhanced heat transfer tube in the present invention is applied on a condenser, the microscale channel can improve distribution of liquid membrane thickness on outer fin surface to enhance condensing heat exchange.

13 Claims, 5 Drawing Sheets

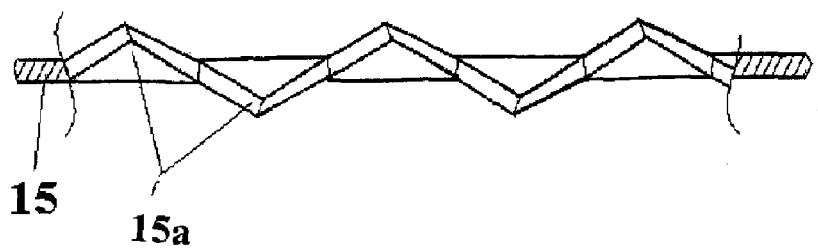
fig 8
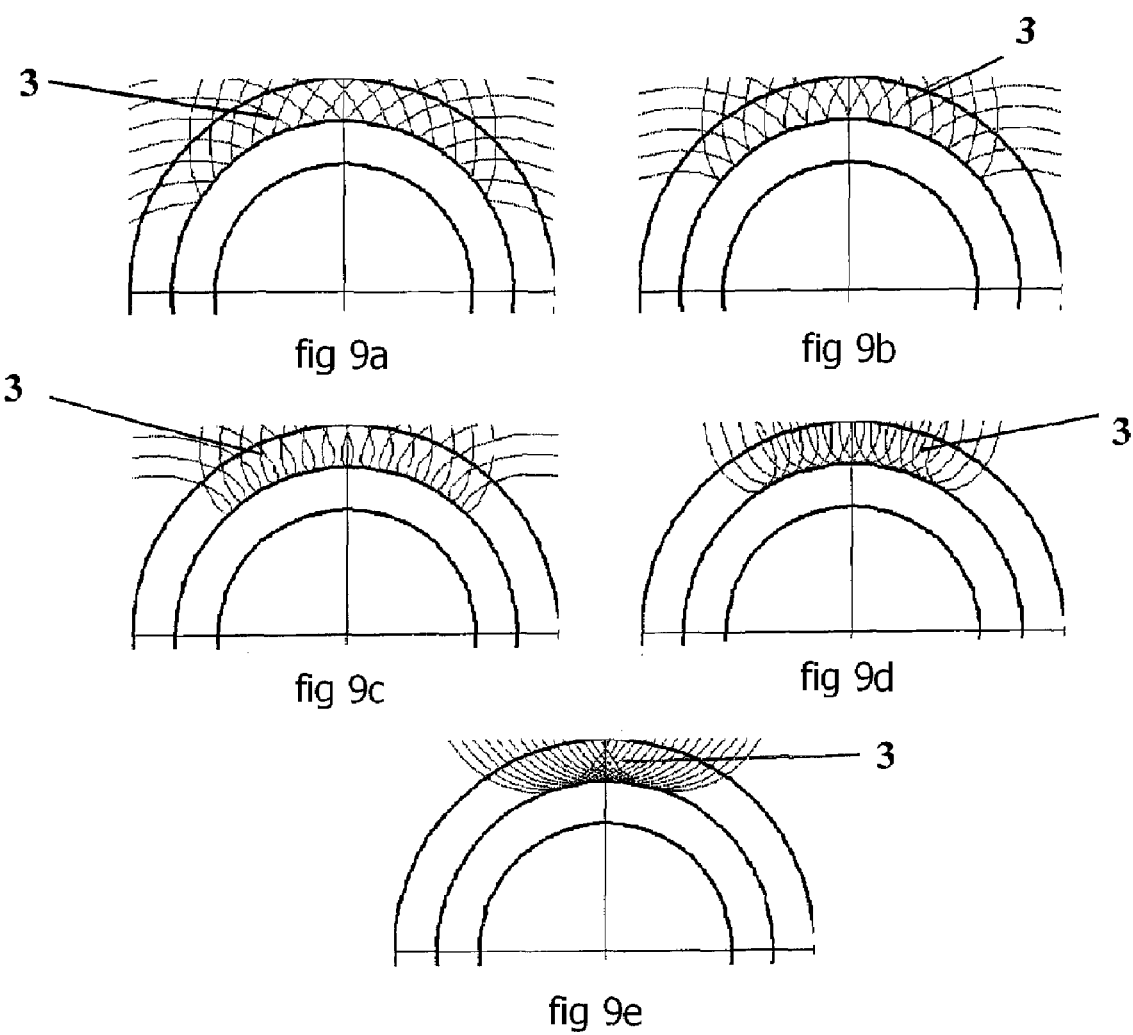
fig 9a
fig 9b
fig 9c
fig 9d
fig 9e

ENHANCED HEAT TRANSFER TUBE AND MANUFACTURE METHOD THEREOF

PRIORITY INFORMATION

The present application is based on and claims priority under 35 U.S.C. §119(a-d) to Chinese Patent Application No. 200810019684.4, filed on Mar. 12, 2008, the entire contents of which is expressly incorporated by reference herein.

BACKGROUND OF THE INVENTIONS

1. Field of the Inventions

The present inventions relate to enhanced heat transfer tubes which can be used as, for example, heat exchange elements of evaporators and condensers for refrigeration and air conditioning systems, as well as manufacture methods for the heat transfer tube, which falls into the technical field of heat exchange element and manufacture technique.

2. Description of the Related Art

Liquid boiling or condensing on outer surfaces of tube bundles is involved in the fields of refrigeration, air conditioning, process engineering, petrochemical industry, and energy and power engineering. For the evaporators and condensers used in refrigeration and air conditioning systems, the thermal resistance of phase change heat exchange during refrigerant boiling or condensing on the outer surfaces of the tubes is equivalent to or even larger than that of forced convection heat exchange inside the tube. Thus, significant improvement to heat transfer performance of evaporator and condenser can be achieved by enhancing phase change heat exchange on the outer surfaces of such tubes.

The study of nucleate boiling shows that boiling of a liquid requires the existence of nucleation sites. For a heating surface with given superheating temperature, only when the radius of the nucleation site is larger than minimum radius required by the vapor bubble growth of the liquid, a vapor bubble can grow, and hence nucleating boiling can be carried out. Cavities formed by grooves and/or cracks on the heating surface are more likely to become nucleation sites.

During boiling processes, after vapor bubbles grow and leave the cavities, some vapor is retained by the cavities and is not completely expelled by liquid flowing into the cavities. These retained amounts of vapor becomes new nucleation sites, growing new vapor bubbles to continue the boiling process. Thus, one way to enhance nucleation boiling heat exchange is to form more nucleation sites on the heating surface.

Since the 1970s, many developments for enhancing boiling heat transfer surfaces have been directed to the formation of numerous structures on heating surface, which can be found in many publications. For example, a heat exchange tube for evaporator disclosed in Chinese patent ZL95246323.7 (publication number CN2257376Y) and ZL03207498.0 (publication number CN2662187Y) has helical fins with top thereof pressed into a T-shape on its outer surface, so as to form channel structures. A heat exchange tube disclosed in Chinese patent ZL95118177.7 (publication number CN1090750C) and ZL02263461.4 (publication number CN2557913Y) has helical fins with inclined teeth uniformly distributed along the circumferential direction, in which cavity structures are formed by pressing the fin to make tooth top of the fin extend toward two sides. A heat exchange tube disclosed in Chinese patent CN1366170A (application number 02101870.7) has fins formed by machining on its outer surface, and secondary channels formed at bottom of the primary channels among the fins. A heat exchange tube disclosed in Chinese patent CN1100517A (application number 94116309.1) has fins on its outer surface pressed to be inclined toward one side, and cavity structures are formed by impressing notches on the shoulder part of the fins. Another heat exchange tube for evaporator is disclosed in ZL02264793.7 (publication number CN2572324Y) which has helical fins with sawtooth structures formed by machining on its outer surface, and cavity structures are formed by impressing inclined notches on the sawtooth top. A heat exchange tube disclosed in Chinese patent CN1731066A (application number 200510041468.6) has fins and transverse spikes formed by machining on its outer surface to form composite cavity structures.

In the aforementioned references, the outer wall surfaces, which are also referred to as "outer fin structures", of the heat transfer tubes have a common structural feature that the heat transfer tubes are provided with channels or cavities with slightly small openings to constitute nucleation sites or carriers for evaporating, so as to enhance effect of the boiling heat transfer.

In recent years, structures on fin surfaces has been further explored to achieve more nucleation sites, so as to provide heat transfer tubes with further improved heat exchange coefficients of phase change heat exchange. This type of heat transfer tube can greatly increase heat exchange area without reducing mechanical strength of the enhanced heat transfer tube even in absence of phase change heat transfer, can enhance disturbance of fluid flowing by the heat exchange surface, and can reduce velocity boundary layers and temperature boundary layers, thus improving heat exchange performance and reducing weight of the heat transfer tube to certain extent.

However, in the disclosed references, there is no suggestion for outer fin structure on the outer tube of the heat transfer tubes for evaporators and condensers which can improve the phase change heat exchange coefficient significantly. Additionally, there is no suggestion of a process through which a phase change heat exchange coefficient can be significantly improved by machining outer fin surface of the enhanced heat transfer tube via appropriate mechanical machining.

SUMMARY OF THE INVENTIONS

An object of at least one of the present inventions is to provide an enhanced heat transfer tube with an outer fin having large heat exchange area for achieving improved heat transfer performance.

An object of at least one of the inventions includes providing a method for manufacturing enhanced heat transfer tubes, which can ensure that the outer fin surface of the enhanced heat transfer tube can be processed into structure capable of significantly increasing phase exchange heat exchange coefficient.

An object of at least the present inventions can be achieved by providing an enhanced heat transfer tube, which can include a tube body, and outer fins integrated with the tube body which are formed by allowing material on the tube body to extend along radial direction of the tube body and wind and extend around the tube outside surface in helical manner. Additionally, microscale channels can be formed on at least one lateral surface of the outer fin.

The microscale channels can be densely formed on at least one lateral surface of the outer fin.

The microscale channels can have a width of 0.001-0.5 mm and depth of 0.001-0.2 mm.

The average interval between the microscale channels can be 0.005-5.0 mm.

The upper part of the outer fin can be provided with notches. A tooth platform can be formed between two adjacent notches and the depth of the notch can be smaller than the height of the outer fin. The notch and the tooth platform can constitute the portion of the outer fin that has a sawtooth shape. At least one arc microscale channel can extend from the root of the tooth platform to the top and can be provided on at least one tooth platform lateral surface of a pair of tooth platform lateral surfaces of corresponding two sides of the tooth platform facing the notch. The arc microscale channel can have a width of 0.001-0.5 mm and depth of 0.001-0.2 mm.

The top two sides of the tooth platform can be provided with a fin top edge formed by the material of the tooth platform extending toward two sides.

An object of at least one of the present inventions can be achieved by providing a method for manufacturing an enhanced heat transfer tube. The method can comprise providing a first tool set formed by an outer fin grooving tool, an outer fin forming tool, and a microscale channel grooving tool. The method can also include fitting the first tool set on a tool support, allowing the tube body to rotate relatively to the first tool set, forming outer fins integrated with the tube body while the tube body rotating relatively to the first tool set by making the material on the tube body extend along radial direction of the tube body and wind and extend around the tube outer surface in helical manner by using the outer fin grooving tool and the outer fin forming tool, and simultaneously carving the microscale channels on the lateral surface of the outer fin by using blades uniformly distributed on the edge of the microscale channel grooving tool.

A method for manufacturing an enhanced heat transfer tube can comprise providing a first tool set formed by an outer fin grooving tool, an outer fin forming tool, and a microscale channel grooving tool. The method can also include fitting the first tool set on a tool support, allowing the tube body to rotate relatively to the first tool set, forming outer fin integrated with the tube body while the tube body rotating relatively to the first tool set by making the material on the tube body extend along radial direction of the tube body and wind and extend around the tube outer surface in helical manner by using the outer fin grooving tool and the outer fin forming tool, and simultaneously carving the microscale channels on the lateral surface of the outer fin by using blades uniformly distributed on the edge of the microscale channel grooving tool. Additionally, the method can include providing a second tool set formed by a fin top grooving tool and a microscale channel grooving tool, fitting the second tool set on a tool support, allowing the tube body to rotate relatively to the second tool set, using the fin top grooving tool to carve notches on the upper part of the outer fin during the tube body rotating relatively to the second tool set, allowing the outer fin to be in sawtooth shape via the tooth platform formed between two adjacent notches, and simultaneously forming at least one arc microscale channel extending from the root of the tooth platform to the top on at least one tooth platform lateral surface of a pair of tooth platform lateral surfaces of corresponding two sides of the tooth platform facing the notch by using blades uniformly distributed on the edge of the microscale channel grooving tool.

The microscale channel grooving tool can be formed by two disc thin cutters with toothed blades at edges. A concave gasket can be arranged between two disc cutters, while convex gaskets are each respectively provided at one side opposite to the concave gasket of the two disc cutters. The diameters of the concave gasket and the convex gaskets can be smaller than that of the thin cutter, and the blades of the thin cutter warp toward two sides along axial direction of the thin cutter after the concave gasket, the convex gasket pair, and the two thin cutters are fixed.

The edge of the microscale channel grooving tool can be provided with a disc cutter with a toothed blade, and the toothed blade can alternately deflect toward two sides of the disc cutter.

Compared with fin tubes in prior arts, embodiments of the present enhanced heat transfer tube can have the advantage that the microscale channel is formed on at least one lateral surface of the outer fin to help increase the heat exchange area of the outer fin surface, improve the fluid disturbance, enhance the forced convention heat exchange out of tube, and significantly improve the heat transfer coefficient. When such an enhanced heat transfer tube is applied on an evaporator, the microscale channel can greatly increase the number of the nucleation sites, so as to enhance boiling heat exchange in condition of low heat flux density. When such an enhanced heat transfer tube is applied on a condenser, the microscale channel can improve distribution of liquid membrane thickness on outer fin surface to enhance condensing heat exchange.

BRIEF DESCRIPTION OF THE DRAWINGS

The above-mentioned and other features of the inventions disclosed herein are described below with reference to the drawings of preferred embodiments. The illustrated embodiments are intended to illustrate, but not to limit the inventions. The drawings contain the following Figures:

FIG. 8 is illustration of enlarged structure of another embodiment of the microscale channel grooving tool 9.

FIGS. 9a, 9b, 9c, 9d, and 9e are channel track illustrations of the microscale channel 3 at different rotation velocity ratios of the tool to the tube body 1.

DETAILED DESCRIPTION OF THE PREFERRED EMBODIMENT

Figure 1:
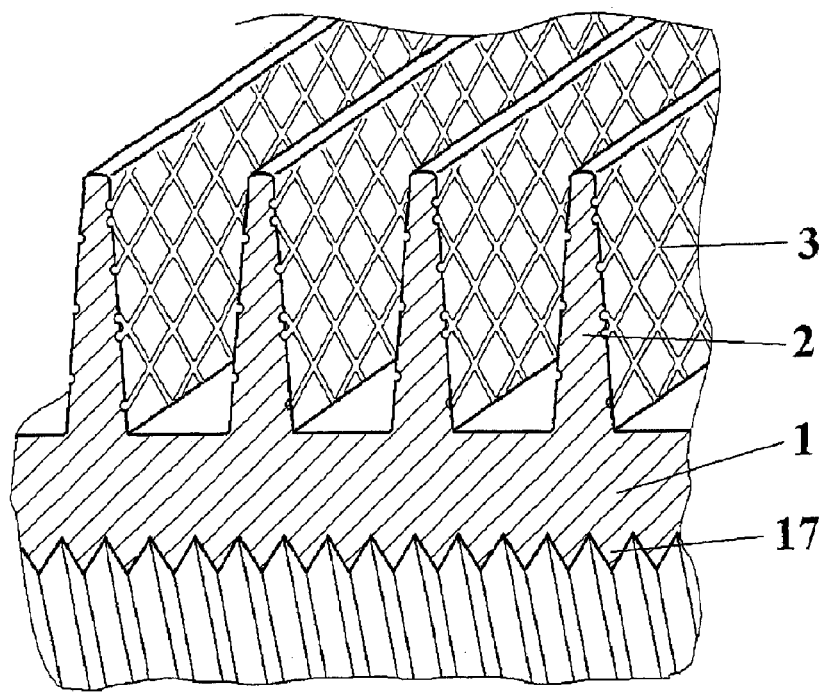
FIG. 1 is an embodiment structure scheme of the enhanced heat transfer tube.

Referring to FIG. 1, the outer fins 2 can be rolled by one time forming on outside wall of a tube body 1 with inner fins 17 to manufacture an enhanced heat transfer tube. The outer fins 2 can be formed by making the material on the tube body 1 extend outward along radial direction of the tube body 1, and can be integrated with the tube body 1. A thermal resistor can be provided between the outer fin 2 and the tube body 1. The outer fins 2 wind and extend around the outside surface of the tube body 1 in helical manner.

While rolling the outer fins 2, a tool can machine dense microscale channels 3 on the lateral surface of the outer fins 2.

Figure 3:
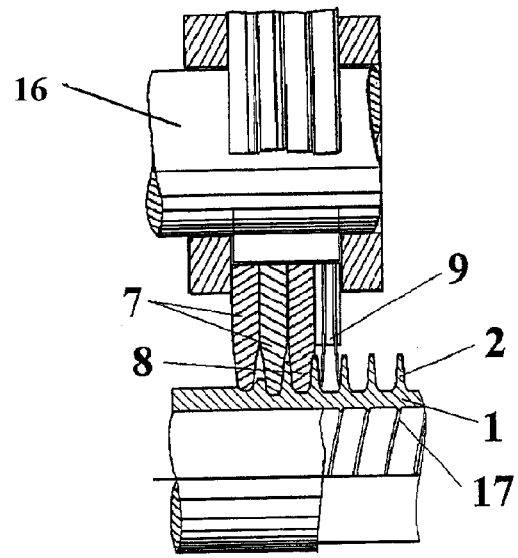
FIG. 3 is the schematic layout for manufacturing the enhanced heat transfer tube in FIG. 1.
Figure 4:
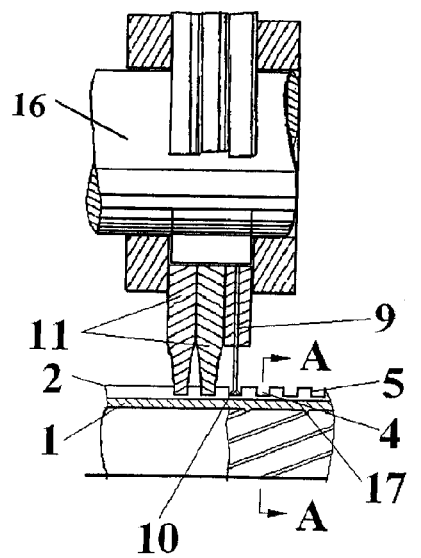
FIG. 4 is the schematic layout for manufacturing the enhanced heat transfer tube in FIG. 2.

These microscale channels 3 can be a cluster of dense curves formed by carving with a microscale channel grooving tool 9 (as shown in FIG. 3 and FIG. 4) rotating relatively to the outer fins 2. These clusters of curves form grid structures on two lateral surfaces of the outer fins 2. The microscale channels 3 with such a grid structure can have dimensions as follows: channel width 0.1 mm, channel depth 0.02 mm, and average interval 0.5 mm.

The structure of the grid microscale channels 3 increases disturbance, reduces or destroys boundary layers, significantly increases heat exchange area, and enhances heat transfer process. For boiling heat exchange, the structure has effect of providing a large amount of nucleation sites with extremely small radius on surface of the outer fin 2. When used in condensing heat exchange, this structure can alter tension distribution of liquid membrane, further reduce thickness of the liquid membrane, and improve heat exchange performance. As the material squeezed out during machining of the microscale channel 3 does not significantly increase the height of the outer fin 2 nor does it significantly reduce the strength of the tube body 1, heat transfer performance can be further improved while reducing weight of the tube body 1.

Figure 2:
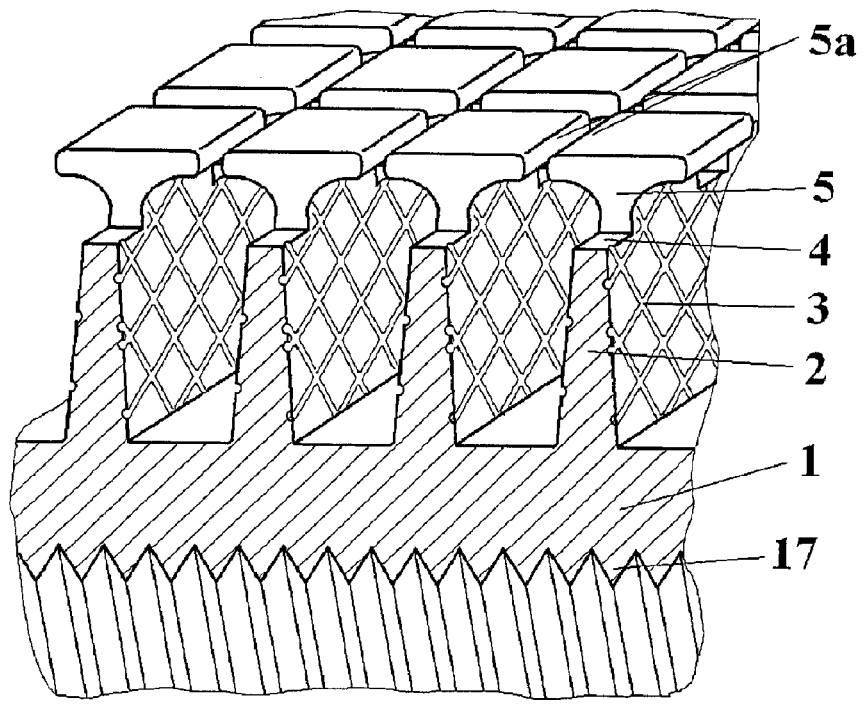
FIG. 2 is another embodiment structure scheme of the enhanced heat transfer tube.
Figure 2A:
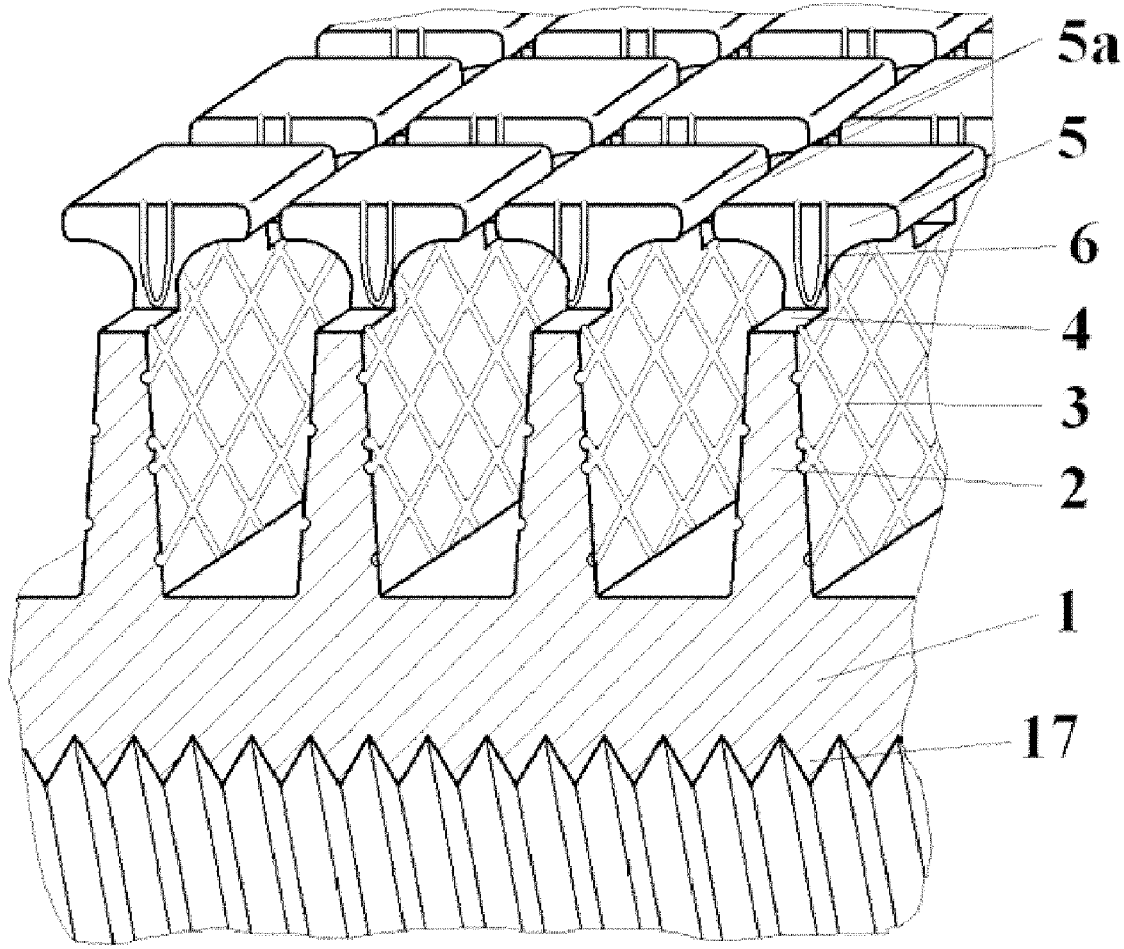
FIG. 2a is a further optional variation of the embodiment of FIG. 2, schematically illustrating arc microscale channels on lateral surfaces of tooth platforms.

Referring to FIG. 2, when the aforementioned heat transfer tube is used as heat exchange tube for a condenser, after the outer fins 2 are rolled and the microscale channels 3 are carved on the lateral surface of the outer fins 2, notches 4 can be to be machined on the outer fins 2 by using a tooth top grooving tool 11 (as shown in FIG. 4). Tooth platforms 5 can be formed between adjacent notches 4. The depth of the notch 4 can be smaller than the height of the outer fin 2, and the notch 4 and the tooth platform 5 can provide the outer fin 2 with a sawtooth shape. Additionally, at the same time, a microscale channel grooving tool 9 (as shown in FIG. 3 and FIG. 4) can carve at least one arc microscale channel 6 (as generally shown in FIG. 2a) extending from the root to the top of the tooth platform 5 on the surface of the two opposite tooth platforms 5 at two sides of the notch 4. The arc microscale channel 6 can be carved when the microscale channel grooving tool 9 performs relative rotation on the lateral surface of the tooth platform 5, whose shape is determined by specific rotation velocity ratio. The arc microscale channel 6 provided on the lateral surface of the tooth platform 5 can improve surface tension distribution of the liquid membrane on the lateral surface of the tooth platform 5, which is beneficial for improving overall condensing heat exchange performance.

Also referring to FIG. 2, when the aforementioned enhanced heat transfer tube is used as heat exchange tube for evaporator, after the microscale channels 3 are carved on the lateral surface of the outer fins 2 and the arc microscale channels 6 are carved on the lateral surface of the tooth platforms 5, the material of the top of the tooth platform 5 can be allowed to extend toward two sides to form fin top edge 5a. The fin top edge 5a mutually cooperates with an adjacent fin top edge 5a formed by material of the top of the tooth platform 5 also extending toward two sides, to make space between two adjacent outer fins form cavity structure while the microscale channels 3 on the lateral surface of the outer fin 2 and the arc microscale channel 6 on the lateral surface of the tooth platform 5 becoming inner structure of the cavity. These microscale channels 3 and the arc microscale channels 6 not only increase internal heat exchange area of the cavity, but also ensure that the cavity has nucleation sites with small diameter even under low superheating temperature, so as to leave the cavity in an activated state and provide the heat exchange tube with high heat exchange performance at low heat flux density. When the enhanced heat exchange tube is used as heat exchange tube for evaporator, the tooth platform 5 and the arc microscale channel 6 can be eliminated.

Embodiment 2

Figure 6:
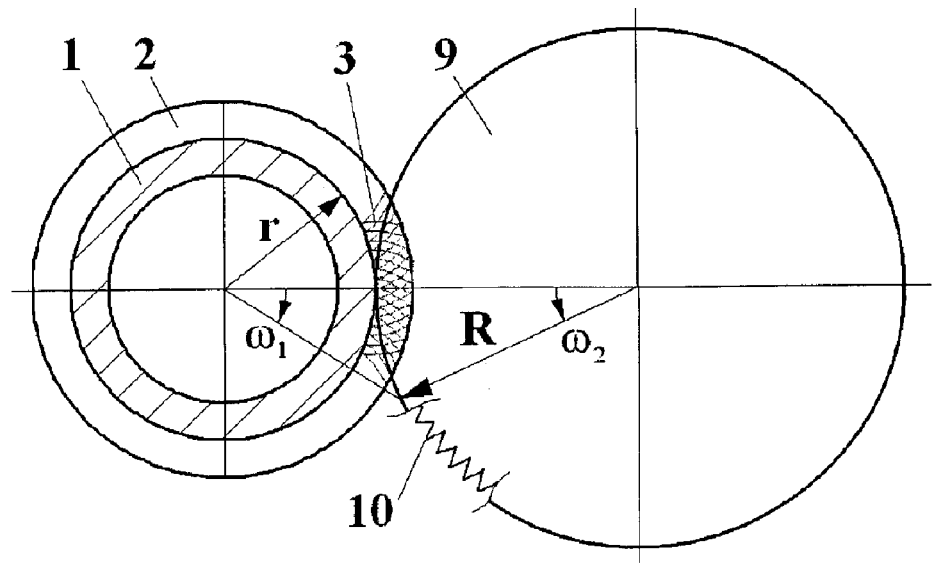
FIG. 6 is illustration for position calculation of the microscale channel 3.

Referring to FIG. 3 and FIG. 6, an outer fin grooving tool 7, an outer fin forming tool 8, and a microscale channel grooving tool 9 can provide a tool set. Such a tool set can be fitted on a tool support 16 (also called tool shaft), in which multiple blades 10 (as shown in FIG. 6) are uniformly provided on the edge of the microscale channel grooving tool 9. The outer fins 2 can be formed by extrusion on a tube body 1.

In some embodiments, the diameter of the tube body 1 at the root of the outer fin 2 can be 20 mm. As the tube body 1 rotates relatively to the tool set, the outer fin 2 with height of 2 mm is formed by the outer fin grooving tool 7 and the outer fin forming tool 8, and microscale channels 3 with channel width of 0.08 mm, channel depth of 0.05 mm, and average channel interval of 0.5 mm are orderly carved on the lateral surface of the outer fins 2 by the blades 10 (as shown in FIG. 6) on the microscale channel grooving tool 9. Here, the average channel interval is defined as the arithmetic average value obtained by dividing the area enclosed by central lines of the adjacent microscale channels 3 by the length of the two central lines.

Referring to FIG. 6, the position of the microscale channel 3 on the lateral surface of the outer fin 2 is calculated as such that the radius at the deepest position of the microscale channel 3 on the outer fin 2 is defined as r, the distance between blade 10 and axial center of the microscale channel grooving tool 9 is defined as R, the rotation angular velocity of the tube body 1 is defined as $\omega_1$, the rotation angular velocity of the microscale channel grooving tool 9 is defined as $\omega_2$, and the time is defined as t. A coordinate system is set on the tube body 1 which rotates along with the tube body 1, i.e., immobile relative to the tube body 1, the microscale channel grooving tool 9 revolves round axial center position $(X, Y)=(O, O)$ at angular velocity of $\omega_1$ while rotating at $\omega_2$, and thus the track carved on the lateral surface of the outer fin 2 by the blade 10 can be calculated as below:

$X = \rho \cdot \cos\theta$ $Y = \rho \cdot \sin\theta$ in which $\rho = \sqrt{X'^2 + Y'^2}$ $\theta = \arctan(Y'/X') + \omega_1 \cdot t$ $X' = r + R - R \cdot \cos(\omega_2 \cdot t)$ $Y' = -R \cdot \sin(\omega_2 \cdot t)$ Referring to FIG. 9, this figure shows more shapes of microscale channels 3 carved on lateral surface of the outer fins 2. The calculation parameters can be as follows: radius r at deepest position of the microscale channel 3 on the outer fin 2 is 8 mm, distance R between the blade 10 and the axial center of the microscale channel grooving tool 9 is 20 mm, interval S between adjacent blades 10 is 1 mm, rotation velocity ratio $\omega_2/\omega_1$ are respectively 0.35, 0.40, 0.47, 0.65, and 1.20. Five independent FIGS. 9a, 9b, 9c, 9d, and 9e respectively illustrate the shape of the microscale channels 3.

The microscale channel 3 shown in FIG. 6 can have calculation parameters as follows: r=16 mm, R=40 mm, $\omega_2/\omega_1$=r/R=0.4, interval S of adjacent blades 10 on the microscale channel grooving tool 9 is 1 mm.

Figure 7:
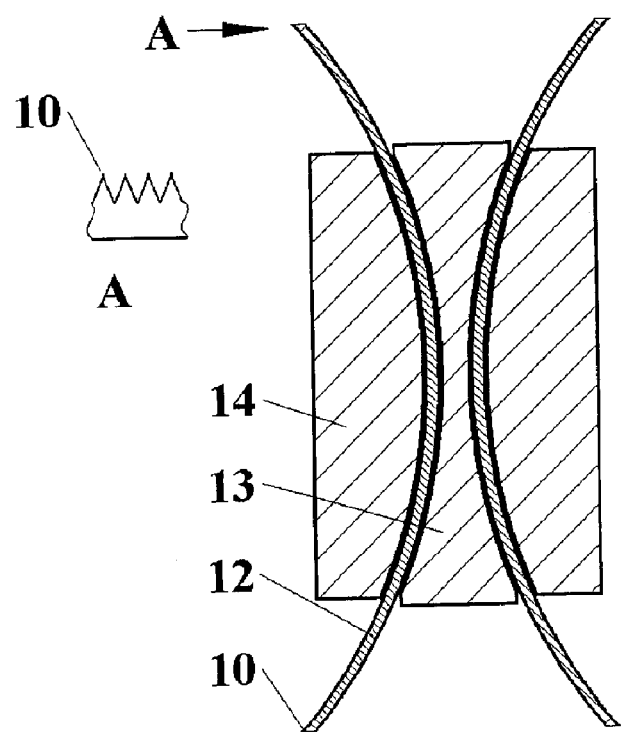
FIG. 7 is structural illustration of the microscale channel grooving tool 9.

Referring to FIG. 7, the microscale channel grooving tool 9 can be manufactured such that the grooving tool is formed by disc thin cutters 12 with toothed blades 10 on two edges thereof, wherein the tooth can be in shape of triangle, rectangle, or other shapes. This embodiment adopts triangular sawtooth.

A concave gasket 13 can be sandwiched between the two thin cutters 12. Convex gaskets 14 are each provided at two ends, i.e. side opposite to the convex gasket 13. The diameters of the convex gasket 13 and the concave gaskets 14 are both less than that of the thin cutter 12. When the tool is fastened, the blades 10 of the thin cutter 12 warp toward two sides along axial direction of the tool. As the diameters of the convex gasket 13 and the concave gaskets 14 are both less than that of thin cutter 12, the thin cutter 12 has certain elasticity, and will not form cut too deep on the outer fins 2. This type of thin cutter 12 is recommended for heat transfer tube with the outer fins 2 with trapeziform cross-section.

Referring to FIG. 8, the microscale channel grooving tool 9 also can be manufactured such as that the grooving tool is formed by disc cutters 15 with toothed blades on edges thereof, and the toothed blades 15a of the disc cutter 15 deflect alternately toward two lateral sides to form toothed blade 15a as shown in the figure. The tooth can be in shape of triangle, rectangle, or other shapes. This embodiment adopts triangular sawtooth.

Embodiment 3

Figure 5:
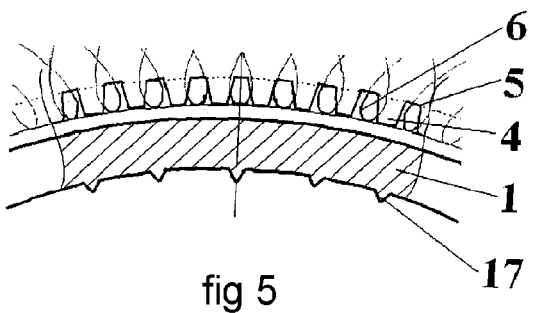
FIG. 5 is enlarged illustration of A-A sectional view of FIG. 4.

Referring to FIG. 4 and FIG. 5 together with FIG. 2, the manufacture of the inventive enhanced heat transfer tube as shown in FIG. 2 for condenser tube is taken as example.

The detailed structure comprises a tube body 1, outer fins 2 formed on outside wall surface of the tube body 1, notches 4 cut on the outer fins 2, and tooth platforms 5 formed between two adjacent notches 4. The depth of the notch 4 is smaller than the height of the outer fin 2. The notch 4 and the tooth platform 5 can constitute the outer fin 2 into sawtooth shape. One or two arc microscale channels 6 (as shown in FIG. 5) which can be extended from the root to the top of the tooth platform 5 are provided on the surface of the tooth platforms 5 opposite at two sides of the notch 4. The outer fins 2 have height of 1.2 mm, the tooth platforms 5 have height of 0.8 mm, the microscale channels 3 and the arc microscale channels 6 have channel width of 0.05 mm and channel depth of 0.01 mm.

In manufacture, outer fins 2 are formed on the outer wall surface of a tube body 1 by using a first tool set formed by an outer fin grooving tool 7 and an outer fin forming tool 8. A second tool set is formed by a fin top grooving tool 11 and a microscale channel grooving tool 9.

Multiple blades 10 are uniformly distributed on edge of the microscale channel grooving tool 9, this tool set is rotated at specific velocity, with rotation velocity ratio of $\omega_2/\omega_1 = 1.14 \cdot r/R$. The fin top grooving tool 11 cuts notches 4 on the outer fins 2. The microscale channel grooving tool 9 is a piece of disc cutter 15 with toothed blades 15a on the edge thereof as shown in FIG. 8, the sawtooth at the disc edge have tooth pitch of 0.5 mm, and are alternately inclined toward two sides of the disc.

The sawtooth tip form toothed blades 15a and carve a group of arc microscale channels 6 extended from the root to top of the tooth platforms 5 on the notchs 4 and opposite lateral side of the adjacent notchs 4. The processing manner of this tool set for the outer fin 2 is shown in FIG. 4.

A third tool set is composed of an outer fin forming tool 8 and a microscale channel grooving tool 9. Multiple blades are uniformly distributed on the microscale channel grooving tool 9. This tool set rotates at rotation velocity ratio of $\omega_2/\omega_1 = r/R$. Redundant fin material extended from the notch bottom to two sides of the outer fins 2, during the process for cutting notches 4, is removed by the outer fin forming tool 8, and the microscale grooving tool 9 carves ordered dense microscale channels 3 on the lateral side of the outer fins 2.

Embodiment 4

Still referring to FIG. 4 and FIG. 5 together with FIG. 2, the manufacture of the inventive enhanced heat transfer tube as shown in FIG. 2 for evaporator tube is taken as example.

This heat transfer tube comprises a tube body 1, outer fins 2 formed on the outer wall surface of the tube body 1, dense microscale channels 3 formed on the lateral side of the outer fins 2, notches 4 cut on the outer fins 2, and tooth platforms 5 formed between two adjacent notches 4. The depth of the notch 4 is smaller than the height of the outer fin 2. The notch 4 and the tooth platform 5 constitute the outer fin 2 into sawtooth shape.

A flat roller can be adopted for extending the material of the top of the tooth platform 5 toward two sides to form fin top edge 5a. The fin top edge 5a mutually cooperates with the fin top edge 5a formed by material of the top of the tooth platform 5 also extending toward two sides, to make space between two adjacent outer fins 2 form cavity structure while the microscale channels 3 of the outer fin 2 lateral surface becoming inner structure of the cavity. In some embodiments, the obtained outer fins 2 have height of 0.98 mm, the microscale channels 3 have channel width of 0.02 mm, and channel depth of 0.01 mm.

In manufacturing process in accordance with some embodiments, two microscale channel grooving tools 9 are adopted, tooth pitch of the tooth-shaped blade 10 on edge of the microscale channel grooving tool 9 is 0.5 mm, the blades of the two microscale channel grooving tools 9 stagger by half tooth pitch, with rotation velocity ratio of $\omega_2/\omega_1 = r/R_1$, to carve grid microscale channel surface structure with interval of 0.25 mm on the lateral surface of the outer fin 2s.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. A heat transfer tube, comprising a tube body, and outer fins integrated with the tube body which are formed by allowing the material on the said tube body to extend along a radial direction of the tube body and wind and extend around the tube outside surface in helical manner, wherein an upper part of the outer fin is provided with notches, a tooth platform is formed between two adjacent notches, the depth of the notch is smaller than the height of the outer fin, the notch and the tooth platform constitute the outer fin in a sawtooth shape, and a plurality of microscale channels having a channel width of 0.001-0.5 mm and a depth of 0.001-0.2 mm are formed on at least one lateral surface of the outer fin, and additionally comprising at least one arc microscale channel extending from the root of the tooth platform to the provided at least one tooth platform lateral surface of a pair of tooth platform lateral surfaces of corresponding two sides of the tooth platform facing the notch, and the arc microscale channel has a width of 0.001-0.5 mm and a depth of 0.01-0.2 mm.

2. enhanced heat transfer tube as claimed in claim 1, wherein the microscale channels are densely formed on at least one lateral surface of the outer fin.

3. The enhanced heat transfer tube as claimed in claim 2, wherein the top two sides of the tooth platform are provided with a fin top edge formed by the material of the tooth platform extending toward two sides.

4. The enhanced heat transfer tube as claimed in claim 1, wherein an average interval between the microscale channels is 0.005-5.0 mm.

5. The enhanced heat transfer tube as claimed in claim 1, wherein the top two sides of the tooth platform are provided with a fin top edge formed by the material of the tooth platform extending toward two sides.

6. The enhanced heat transfer tube as claimed in claim 1, wherein the top two sides of the tooth platform are provided with a fin top edge formed by the material of the tooth platform extending toward two sides.

7. The enhanced heat transfer tube as claimed in claim 1, wherein an average interval between the microscale channels is 0.005-5.0 mm.

8. A method for manufacturing the heat transfer tube as claimed in claim 1, the method comprising providing a first tool set formed by an outer fin grooving tool, an outer fin forming tool, and a microscale channel grooving tool, fitting the first tool set on a tool support, allowing the tube body to rotate relatively to the first tool set, forming outer fins integrated with the tube body while the tube body is rotating relatively to the first tool set by making the material on the tube body extend along radial direction of the tube body and wind and extend around the tube outer surface in helical manner by using the outer fin grooving tool and the outer fin forming tool, and simultaneously carving the microscale channels on the lateral surface of the outer fins by using a blade uniformly distributed on the edge of the microscale channel grooving tool.

9. The method as claimed in claim 8, wherein the microscale channel grooving tool is formed by two disc thin cutters with toothed blades at edges, a concave gasket arranged between two disc cutters, while convex gaskets are each respectively provided at one side opposite to the concave gasket of the two disc cutters, the diameters of the concave gasket and the convex gaskets are smaller than that of the thin cutter, and the blades of the thin cutter warp toward two sides along axial direction of the thin cutter after the concave gasket, the convex gasket pair, and the two thin cutters are fixed.

10. The method as claimed in claim 8, wherein the edge of the microscale channel grooving tool is provided with a disc cutter with toothed blade, and the toothed blade alternately deflects toward two sides of the disc cutter.

11. A method for manufacturing the heat transfer tube as claimed in claim 1, comprising providing a first tool set formed by an outer fin grooving tool, an outer fin forming tool, and a microscale channel grooving tool, fitting the first tool set on a tool support, allowing the tube body to rotate relatively to the first tool set, forming outer fins integrated with the tube body while the tube body rotating relatively to the first tool set by making the material on the tube body extend along radial direction of the tube body and wind and extend around the tube outer surface in helical manner by using the outer fin grooving tool and the outer fin forming tool, and simultaneously carving the microscale channels on the lateral surface of the outer fin by using a blade uniformly distributed on the edge of the microscale channel grooving tool, providing a second tool set formed by a fin top grooving tool and a microscale channel grooving tool, fitting the second tool set on the tool support, allowing the tube body to rotate relatively to the second tool set, using the fin top grooving tool to carve notches on the upper part of the outer fin while the tube body is rotating relatively to the second tool set, allowing the outer fin to be formed into sawtooth shape via the tooth platform formed between two adjacent notches, and simultaneously forming at least one arc microscale channel extending from the root of the tooth platform to the top on at least one tooth platform lateral surface of a pair of tooth platform lateral surfaces of corresponding two sides of the tooth platform facing the notch by using blades uniformly distributed on the edge of the microscale channel grooving tool.

12. The method as claimed in claim 11, wherein the microscale channel grooving tool is formed by two disc thin cutters with toothed blades at edges, a concave gasket arranged between two disc cutters, while convex gaskets are each respectively provided at one side opposite to the concave gasket of the two disc cutters, the diameters of the concave gasket and the convex gaskets are smaller than that of the thin cutter, and the blades of the thin cutter warp toward two sides along axial direction of the thin cutter after the concave gasket, the convex gasket pair, and the two thin cutters are fixed.

13. The method as claimed in claim 11, wherein the edge of the microscale channel grooving tool is provided with a disc cutter with toothed blade, and the toothed blade alternately deflects toward two sides of the disc cutter.

* * * * *